United States Patent
Blatchley et al.

(10) Patent No.: US 9,026,458 B2
(45) Date of Patent: May 5, 2015

(54) APPARATUS, SYSTEM AND PROGRAM PRODUCT FOR DYNAMICALLY CHANGING ADVERTISING ON AN AVATAR AS VIEWED BY A VIEWING USER

(75) Inventors: Robert D. Blatchley, Longmont, CO (US); Jurij M. Deputat, Longmont, CO (US); Donald P. Taylor, III, Longmont, CO (US); Stephen E. Zimmermann, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 2164 days.

(21) Appl. No.: 11/950,340

(22) Filed: Dec. 4, 2007

(65) Prior Publication Data
US 2009/0144105 A1 Jun. 4, 2009

(51) Int. Cl.
G06Q 30/00 (2012.01)
G06F 17/00 (2006.01)
G06F 7/06 (2006.01)
G06Q 30/02 (2012.01)

(52) U.S. Cl.
CPC ........... *G06Q 30/02* (2013.01); *G06Q 30/00* (2013.01); *G06Q 30/0209* (2013.01); *G06Q 30/0224* (2013.01); *G06Q 30/0273* (2013.01)

(58) Field of Classification Search
CPC .......... G06Q 30/00; G06F 17/00; G06F 17/06
USPC ........ 705/7, 10, 14, 14.4, 26; 345/581; 463/9, 463/32; 709/217; 715/41, 706, 753, 863, 715/741
See application file for complete search history.

(56) References Cited

U.S. PATENT DOCUMENTS

| | | | |
|---|---|---|---|
| 5,907,328 A * | 5/1999 | Brush, II et al. | 715/863 |
| 6,023,270 A * | 2/2000 | Brush et al. | 715/741 |
| 6,345,289 B1 * | 2/2002 | Lotspiech et al. | 709/203 |
| 6,954,728 B1 * | 10/2005 | Kusumoto et al. | 705/14.4 |

(Continued)

FOREIGN PATENT DOCUMENTS

JP 2006030482 2/2006
WO WO 2004049113 A2 * 6/2004

OTHER PUBLICATIONS

Dawson, C. et al., U.S. Appl. No. 11/679,449, Avatar-Based Unsolicited Advertisements in a Virtual Universe, filed Feb. 27, 2007.

*Primary Examiner* — Barbara Joan Amelunxen
(74) *Attorney, Agent, or Firm* — Matthew H. Chung; Arthur J. Samodovitz

(57) ABSTRACT

A method, system and program product for brokering advertising of products and services in a virtual world. The method includes accepting subscriptions from advertisers willing to pay for advertising products and services on a persona associated with a virtual space belonging to a virtual world user, creating a user profile based on specified likes/dislikes and establishing whether a user is willing to display advertising on their persona in the virtual world in exchange for receiving a benefit. Further, the method includes displaying advertisements on the persona, such that, the one or more advertisements displayed on the persona dynamically changes based on a viewing user viewing the persona of the advertising user, the one or more advertisements displayed to the viewing user being based on a viewing user profile, such that, the advertisements displayed on the persona varies simultaneously in real time mode from one viewing user to another.

16 Claims, 5 Drawing Sheets

(56) References Cited

U.S. PATENT DOCUMENTS

| | | | |
|---|---|---|---|
| 7,315,826 B1* | 1/2008 | Guheen et al. | 705/7.29 |
| 2002/0022516 A1* | 2/2002 | Forden | 463/32 |
| 2002/0046102 A1* | 4/2002 | Dohring et al. | 705/14 |
| 2004/0107125 A1* | 6/2004 | Guheen et al. | 705/7 |
| 2005/0216346 A1* | 9/2005 | Kusumoto et al. | 705/14 |
| 2006/0074769 A1* | 4/2006 | Looney et al. | 705/26 |
| 2007/0073582 A1* | 3/2007 | Jung et al. | 705/14 |
| 2007/0167204 A1* | 7/2007 | Lyle et al. | 463/9 |
| 2008/0215975 A1* | 9/2008 | Harrison et al. | 715/706 |
| 2008/0307066 A1* | 12/2008 | Amidon et al. | 709/217 |
| 2008/0309675 A1* | 12/2008 | Fleury et al. | 345/581 |
| 2009/0055249 A1* | 2/2009 | Lieberman | 705/10 |
| 2009/0063283 A1* | 3/2009 | Kusumoto et al. | 705/14 |
| 2009/0099925 A1* | 4/2009 | Mehta et al. | 705/14 |
| 2009/0138333 A1* | 5/2009 | Jung et al. | 705/10 |
| 2009/0150245 A1* | 6/2009 | Schwartz | 705/14 |
| 2009/0157493 A1* | 6/2009 | Kreitzer | 705/14 |
| 2009/0158171 A1* | 6/2009 | Cheng et al. | 715/753 |

* cited by examiner

US 9,026,458 B2

APPARATUS, SYSTEM AND PROGRAM PRODUCT FOR DYNAMICALLY CHANGING ADVERTISING ON AN AVATAR AS VIEWED BY A VIEWING USER

FIELD OF THE INVENTION

The present invention relates to computer systems and software, and more specifically to an automated technique for brokering advertising of products and services on an online persona, such as, an avatar, where the advertising dynamically changes based on a profile of a viewer who is viewing the avatar in a virtual world.

BACKGROUND OF THE INVENTION

As virtual worlds become more prevalent in the marketplace, users engage in these virtual worlds with their online persona, namely, an Avatar, as a means of self portrayal. Moreover, the users are also able to customize the look of their Avatar and are even able to create pets and other accessories that are attached to their online persona in the virtual world. Increasingly, such virtual worlds serve as a vehicle for buying and/or selling goods and services and a means for advertising of goods and services. As such, advertising companies require innovative ways to market themselves and advertise their goods and services and their company as a whole within these virtual worlds, such that, more advertising opportunity can be obtained.

SUMMARY OF THE INVENTION

The present invention resides in a method, system and program product for brokering advertising of products and services in a virtual world. The method includes accepting, by a provider of a virtual world, subscriptions from one or more advertisers of a plurality of advertisers willing to pay the provider for brokering advertising of respective products and services offered by the one or more advertisers on a respective persona associated with a respective virtual space belonging to a respective user of a virtual world provided by the provider, creating a profile for each user of one or more users accessing the virtual world, the profile created for each user being based on likes and dislikes specified by each user and establishing whether a user of the one or more users is interested in becoming an advertising user willing to display advertising of the plurality of advertisers in a virtual space belonging to the user in exchange for receiving a benefit. Further, the method includes displaying one or more advertisements on a persona associated with a virtual space belonging to the advertising user, such that, the one or more advertisements displayed on the persona associated with the virtual space belonging to the advertising user dynamically changes based on a viewing user of the one or more users viewing the persona of the advertising user, the one or more advertisements displayed to the viewing user being based on a profile created for the viewing user and, such that, the one or more advertisements displayed on the persona of the advertising user varies from one viewing user to another viewing user viewing the persona of the advertising user simultaneously in a real time mode. Furthermore, the method includes tracking exposure of the one or more advertisements displayed on the persona associated with the virtual space belonging to the advertising user in the virtual world, such that, the persona includes at least one of: an avatar, a pet and property, such that, the tracking exposure includes at least one of: tracking time per viewing user of an advertisement displayed on a respective persona of a respective advertising user in the virtual world, tracking number of video output frames for which an advertisement is displayed on a respective persona of a respective advertising user in the virtual world, tracking time based on mileage of a respective persona of a respective advertising user in the virtual world, and tracking time based on square area covered by a respective persona of a respective advertising user in the virtual world. Further, the method includes updating one or more profiles maintained for the one or more users of the virtual world for determining types of advertisements to be displayed on the persona associated with the virtual space belonging to a respective advertising user based on the one or more profiles updated for one or more viewing users viewing the persona associated with the virtual space belonging to the respective advertising user. The method further includes paying a fee, by the one or more advertisers of the plurality of advertisers, to the provider for brokering advertising of the respective goods and services offered by the one or more advertisers on the respective persona associated with a respective virtual space belonging to respective user of the virtual world. The method further includes disbursing the benefit to the advertising user based on the exposure tracked for the one or more advertisements displayed on the persona associated with the virtual space belonging to the advertising user. In an embodiment, the establishing step further includes selecting, by the advertising user, one or more products and services of the one or more advertisers that the advertising user is interested in advertising in the virtual space belonging to the advertising user. In an embodiment, the displaying step further includes dynamically altering the one or more advertisements displayed on a respective persona associated with a respective virtual space belonging to a respective advertising user when a newly joined viewing user is viewing the persona. In an embodiment, displaying step further includes clicking, by a respective viewing user, a logo corresponding to an advertisement displayed on the respective persona associated with the respective virtual space, such that, the respective viewing user is transported to a URL (Uniform Resource Locator) address that provides additional information or additional advertising associated with the logo corresponding to the advertisement displayed on the persona. The present invention is directed to a system for dynamically altering an advertisement seen on a persona associated with a user in a virtual world, comprising:

a network communications channel;

at least one server connected to said network communications channel and being configured to host an online virtual world application hosted by a provider of a virtual world, said at least one server comprising a processor configured to execute processing functions and to coordinate a plurality of activities and events for hosting said online virtual world application;

one or more clients connected to said network communications channel, each of said one or more clients having a user interface for allowing a user of one or more users access to said virtual world created by said online virtual world application;

a tool deployed on said at least one server, said tool being configured to broker advertising of advertisements between one or more advertisers and one or more users of said online virtual world application, said tool further comprising:

an advertiser module for receiving input pertaining to one or more advertisers willing to advertise in said virtual world;

a subscription module for receiving subscription input corresponding to an advertiser of said one or more advertisers interested in advertising products and services on a respective persona associated with a respective virtual space belonging to a respective user in said virtual world;

an account user module for creating an account for a respective user seeking access to said virtual world;

a user profile module for creating a profile for said respective user, said profile containing likes and dislikes with respect to products and services offered by said one or more advertisers;

an advertising user module for identifying an advertising user of said one or more users willing to display an advertisement on a persona associated with said advertising user in said virtual world; and an advertising profile module for displaying an advertisement on said respective persona associated with said advertising user based on a profile created for a respective viewing user, said advertisement displayed on said respective persona associated with said virtual space belonging to said advertising user corresponding to a profile created for said respective viewing user, wherein a different viewing user sees, in real time, a different advertisement on said respective persona associated with said advertising user.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
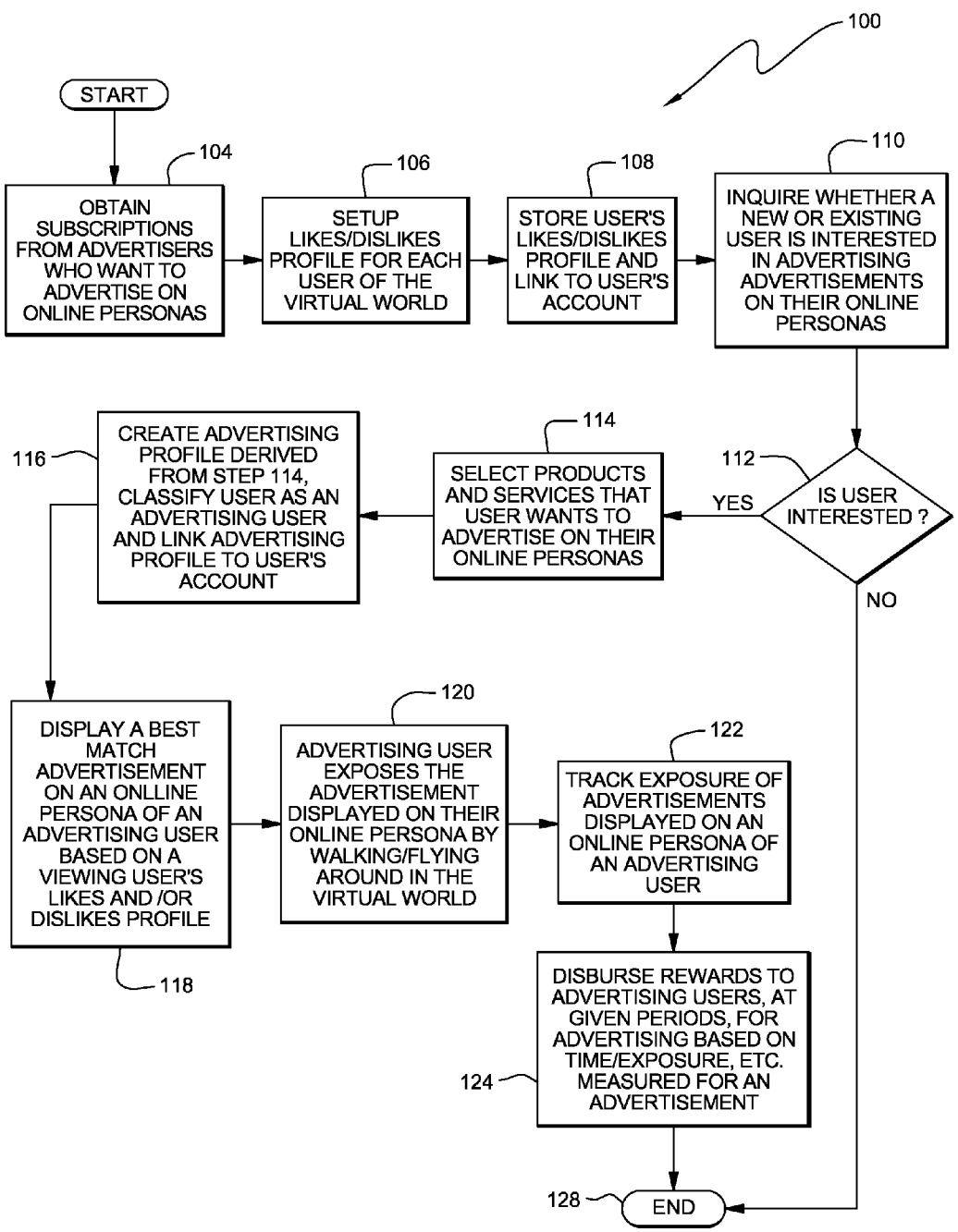
FIG. 1 depicts a flowchart outlining the steps performed by a brokering virtual advertisement tool for brokering advertising of one or more advertisements of an advertiser on a persona associated with a virtual space belonging to an advertising user in a virtual world, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, as shown in FIG. 1, the invention provides a method 100 for brokering advertisements of one or more advertisers on an online persona (such as, an avatar or a pet or property) associated with a virtual space belonging to a user in a virtual world (the user being referred to herein as an "advertising user"), such that, the advertisements displayed on the persona associated with the virtual space belonging to the advertising user dynamically changes based on another user (a "viewing user") that is viewing the persona of the advertising user. As used herein, although the viewing user refers to a person at their computer, in the virtual world, the viewing user refers to the viewing user's persona that views the advertising on the advertising user's persona, given that the viewing user's persona has a line of sight that sees the advertising user's persona. In particular, the invention provides a method for brokering advertisements of one or more advertisers on an online persona associated with a virtual space belonging to an advertising user in a virtual world, using a brokering virtual advertisement tool or code configured to broker advertisements, such that, the advertisements displayed on an online persona associated with a virtual space belonging to an advertising user dynamically changes in real time based on a viewing user viewing the persona of the advertising user and, such that, different viewing users can view simultaneously different advertisements displayed on the same online persona. Turning to FIG. 1, the method 100 starts at step 104 with a provider of a virtual world (referred to herein as a "virtual world provider") attaining subscriptions from advertisers who want to advertise on an online persona associated with a virtual space belonging to an advertising user in a virtual world. Further, in step 106, the virtual world provider utilizes the brokering virtual advertisement tool to ask new users and/or existing users, for instance, users that are logging in to setup a likes and/or dislikes profile. In an embodiment, the questions are geared towards identifying product likes/dislikes of current advertisers. In an embodiment, a response to these questions that are asked by the virtual world provider is mandatory for all users. The user's likes and/or dislikes profile is stored in a storage system, such as, a database, and is linked to the user's account in step 108. Further, in step 110, the virtual world provider asks new and/or existing users that are logging in if they are interested in advertising on their online persona, such as, an avatar or a pet or property, in exchange for receiving a benefit. A determination is made by the brokering virtual advertisement tool in step 112 as to whether or not the user is interested. If the brokering virtual advertisement tool determines in step 112 that the user is not interested in advertising on their online persona, then the process ends in step 128. However, if the brokering virtual advertisement tool determines that the user is interested in advertising on their online persona, then in step 114 the user is presented with a list of products or product types and/or services that a user can sign up to advertise for and can input or make product and/or service selections. Further, in step 116, the brokering virtual advertisement tool classifies the user as an advertising user and an advertising profile derived from the selected products and/or services is linked to the user's account. As such, in step 118, the brokering virtual advertisement tool displays or shows an advertisement on an online persona associated with an advertising user based on the advertising profile created for the advertising user in step 116 and based on a likes and/or dislikes profile created for a viewing user viewing the advertisement displayed on the online persona. In step 120, the advertising user's online persona walks and/or flies and/or is viewed by other viewing users in the virtual world and depending on the viewing user's likes and/or dislikes profile, the brokering virtual advertisement tool shows or displays a different advertisement to the viewing user on the online persona of the advertising user, as discussed herein below with respect to FIG. 2. Further, in step 122, the brokering virtual advertisement tool tracks for the virtual world provider exposure of the advertisements displayed on an advertising user's online persona. In an embodiment, the brokering virtual advertisement tool tracks exposure of the advertisement displayed on an online persona based on one or more of the following measurements: time per viewing user that an advertisement is displayed on a respective persona of a respective advertising user in the virtual world, the number of video output frames for which an advertisement is displayed on a respective persona of a respective advertising user in the virtual world, mileage of a respective persona of a respective advertising user in the virtual world or square area covered by a respective persona of a respective advertising user in the virtual world. Additionally, in step 124, the brokering virtual advertisement tool awards (on a periodic basis) an advertising user a benefit for advertising of advertisements on the online persona of the advertising user. In an embodiment, the benefit received by the advertising user comprises at least one of: money, coupons, discounts or merchandise. In an alternative embodiment, instead of the virtual world provider allowing a user the option of displaying advertising on their online persona, the virtual world provider may require advertising by every user in the virtual world and would broker advertisements using the brokering virtual advertisement tool to create advertising profiles for the users, so as to make sure that each advertisement displayed on an online persona of an advertising user is in good taste and in line with the user's likes and/or dislikes. Further, in an alternative embodiment, a viewing user being shown an advertisement on the online persona belonging to an advertising user, may be given the ability to click or drill down on an advertised logo, such that, the viewing user may be shown an expanded product or service specific page relating to the advertisement shown or the viewing user may be directed to another web site, such as, a virtual company store.

Figure 2:
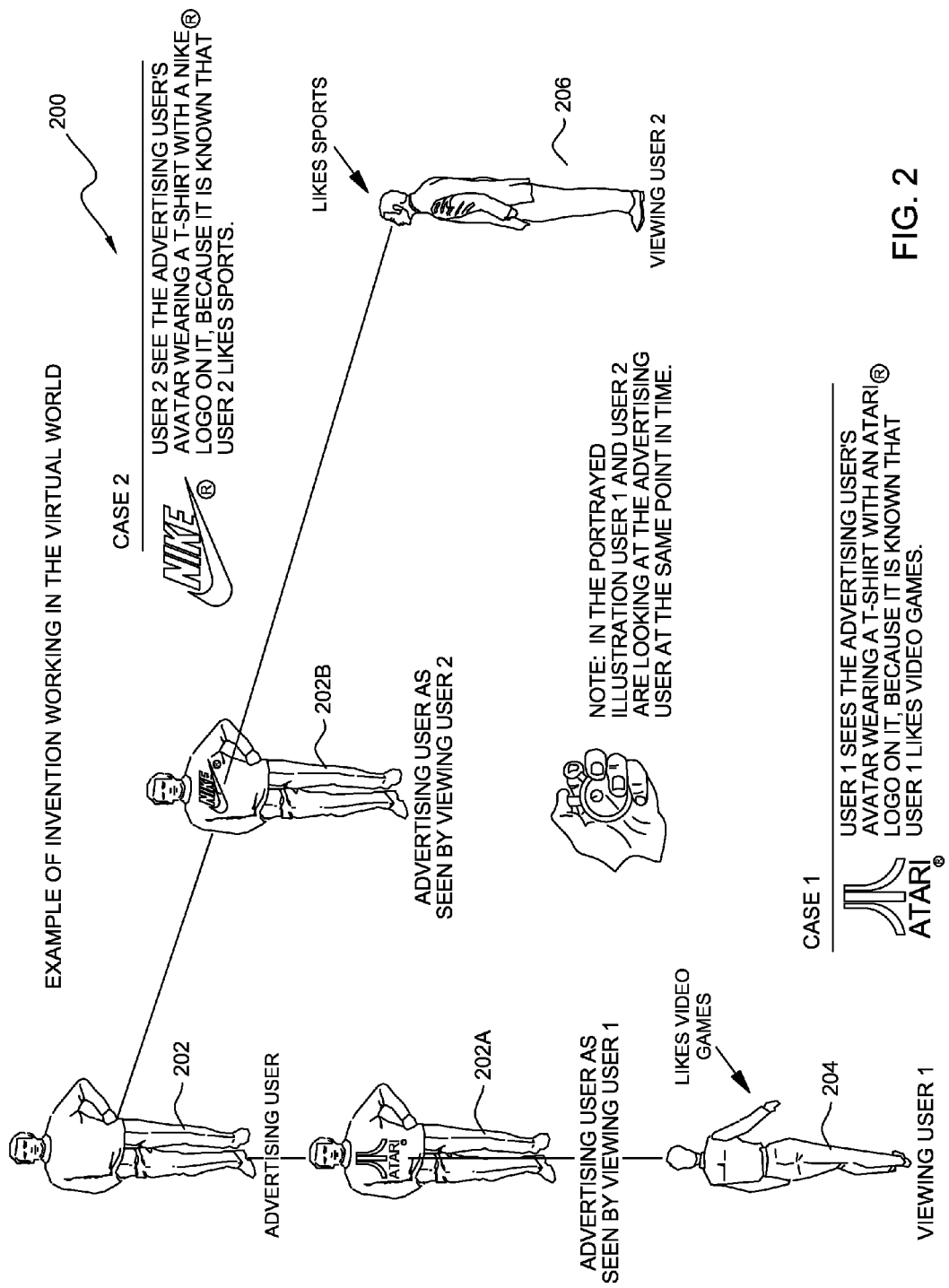
FIG. 2 is a schematic illustration of examples of one or more advertisements of one or more advertisers being displayed on a persona associated with a virtual space belonging to an advertising user, as viewed by one or more viewing users in a virtual world, in accordance with an embodiment of the present invention.

Turning to FIG. 2, reference numeral 200 illustrates an example of the brokering of advertisements displayed on an online persona of an advertising user, as viewed by one or more viewing users 1 and 2 (reference numerals 204 and 206, respectively) at the same point-in-time in a virtual world. In particular, as shown in FIG. 2, advertising user's online persona 202 displays an advertisement on a t-shirt that is a match to a viewing user's likes and/or dislikes profile inputted for the viewing user. For instance, if the likes and/or dislikes profile for viewing user 1 (reference numeral 204), indicates that viewing user 1 likes video games, then the advertising user's online persona 202A shows an advertisement of an ATARI® logo on the online persona's t-shirt, as viewed by viewing user 1. On the other hand, if there is another viewing user 2 (reference numeral 206) viewing the online persona of the advertising user 202 at the same time as viewing user 1, and if the viewing user's likes and/or dislikes profile indicates that viewing user 2 likes sports, then the advertising user's online persona 202B, as viewed by viewing user 2, shows an advertisement of the NIKE® logo on the online persona's t-shirt. Accordingly, even though the advertising user's online persona is being viewed at the same point-in-time, different viewing users may be shown different advertisements based on the likes and/or dislikes profile entered for the respective viewing users. Additionally the virtual world user would be given the option at many junctions in virtual space to receive a benefit or payment (brokered through the virtual world provider) for allowing a company to advertise in his persona's space. When a merchant is registering or setting up their presence in the virtual world, when given advertising options, one prompt or question to the merchant would be would you like to advertise on user's avatars. They would also specify how much they would be willing to spend for this service. In this way the merchant identifies it is interested in paying out for avatar advertising and gives the virtual world provider the limit it wants to spend for this advertising. The user is engaged by the virtual world and asked if they would like to receive payment (or other benefit, such as, discounts at that merchant's store) for advertising a given merchant's or merchants advertisement on their avatar's virtual space. This engagement can be made at several stages, such as, during user setup or registration, when a user logs in to the virtual world, after the user purchases something from that merchant, or even using direct email. The advertisement could be placed on several areas of the avatar's space, for instance, on a sign that is held or floats somewhere near the avatar, on that avatar's accessories, on any avatar pets. The virtual world user could receive more payment or benefit for each piece of customization that he/she puts an advertisement on. The amount of payment/benefit to the user could be based in proportion to the amount of visibility he/she provides in the virtual world. For example if the user walks around a lot (gets high mileage) he would be paid more. If the person is seen more by other users, they are paid more (this could be calculated based on point of users observations). The invention would additionally provide the ability to have the clothing/sign associated with the avatar/pet to change in accordance with who is looking at him/her/it. For instance, if a user's profile says that the user likes to shop at the GAP® store and the user looks at your avatar, then an advertisement for the GAP® brand would appear. Someone standing right next to the user whose profile says that he is interested in gadgets may see an advertisement for circuit city on the user's shirt.

Figure 3:
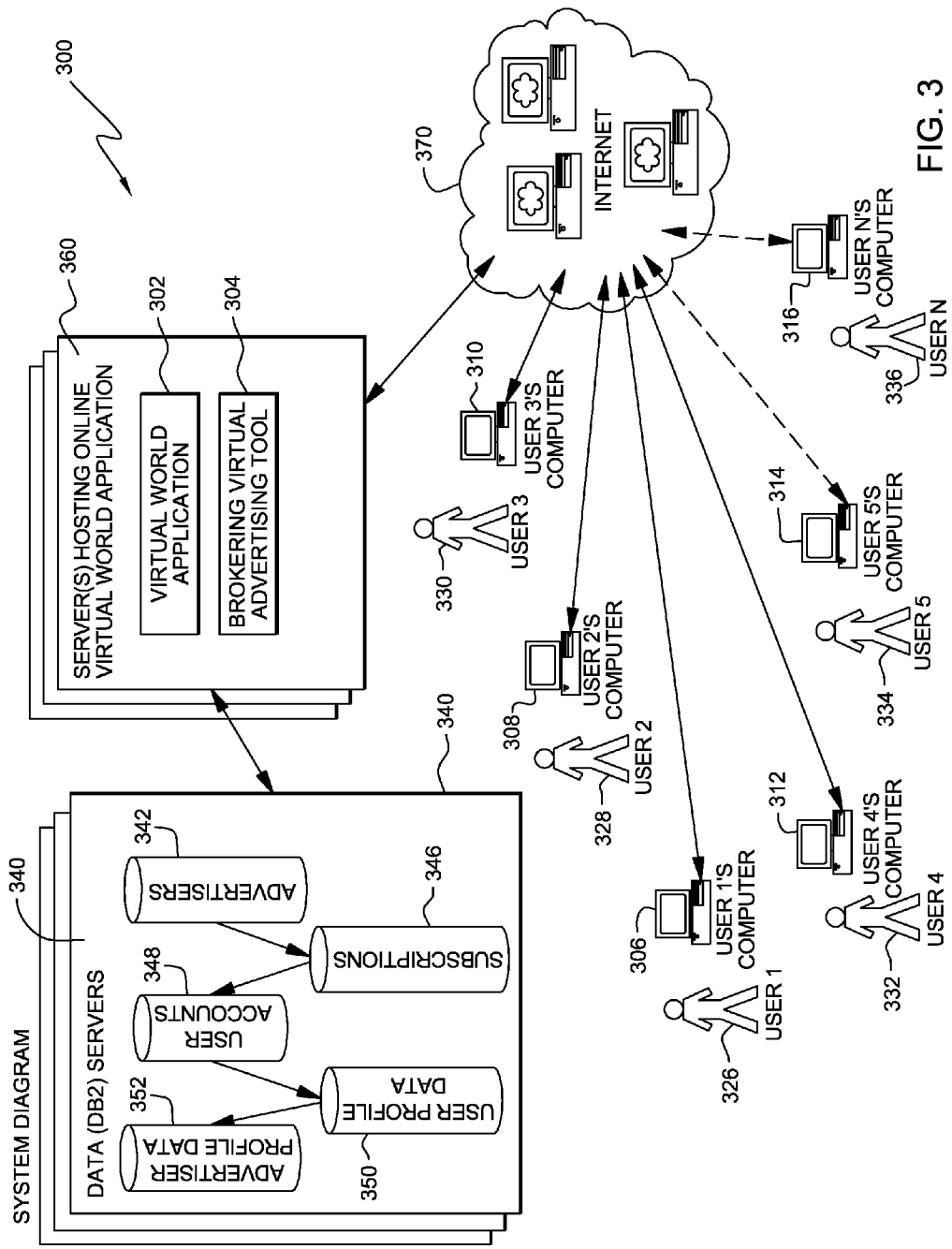
FIG. 3 is a schematic block system diagram illustrating an embodiment of a virtual world system having deployed thereon a virtual world application and a brokering virtual advertisement tool or code for brokering advertising of one or more advertisements of an advertiser on a persona associated with a virtual space belonging to an advertising user in a virtual world, in accordance with an embodiment of the present invention.

In another embodiment, the invention provides a system for brokering advertising of one or more advertisements of an advertiser on an online persona associated with a virtual space belonging to an advertising user in a virtual world, in accordance with an embodiment of the present invention. Turning to FIG. 3, reference numeral 300 depicts a schematic block system diagram illustrating one embodiment of a computer system 300, such as, an application server 360 hosted by a virtual world provider for providing a virtual world environment and for brokering advertising of products and services on an online persona associated with a virtual space belonging to a user in the virtual world environment. In an embodiment, the server 360 has deployed thereon a virtual world application or code 302 that creates the virtual world environment and which calls a brokering virtual advertisement tool 304 deployed on the server 360, the brokering virtual advertisement tool 304 being configured to broker advertisements in a virtual world, as described herein above. As shown in FIG. 3, in an embodiment, the system 300 includes a plurality of servers 360 that are configured to host a virtual world application 302. Further, the system 300 includes a network communications channel 370, such as, the Internet, which enables users to connect to the server(s) 360 utilizing one or more client(s). For instance, a user 1 (reference numeral 326) using a client 306 may access the server 360 via the Internet 370. Similarly, users 2, 3, 4, 5 through N (reference numerals 328, 330, 332, 334 through 336, respectively) may access the servers 360 using respective clients, reference numerals 308, 310, 312, 314 and 316 via the network communications channel 370, which facilitates network communications of the system 300 over a communications channel of a network. In an embodiment, data associated with hosting a virtual world application and brokering of advertisements in the virtual world is stored in one or more database servers 340. As shown in FIG. 3, in an embodiment, the brokering virtual advertisement tool 304 maintains data for one or more advertisers advertising in a virtual world in a database 342. Further, the brokering virtual advertisement tool 304 stores data pertaining to the one or more subscriptions obtained from the one or more advertisers willing to pay the virtual world provider for brokering advertising of products and services on an online persona associated with a virtual space belonging to a user in the virtual world in database 346. Further, the brokering virtual advertisement tool 304 stores data pertaining to user accounts for users in the virtual world in database 348. In addition, the user profiles for a user that pertains to likes and dislikes pertaining to products and/or services that are specified by the user is maintained in a database 350. Further, the database 350 maintains one or more profiles for an advertising user willing to allow an advertiser to display advertisements in a virtual space belonging to the advertising user, based on likes and dislikes pertaining to the one or more advertisements available for display. The advertising profile data pertaining to the one or more advertisements to be displayed on an online persona associated with an advertising user in a virtual world, based on the advertisements selected by the advertising user, is stored in a database 352.

Figure 4:
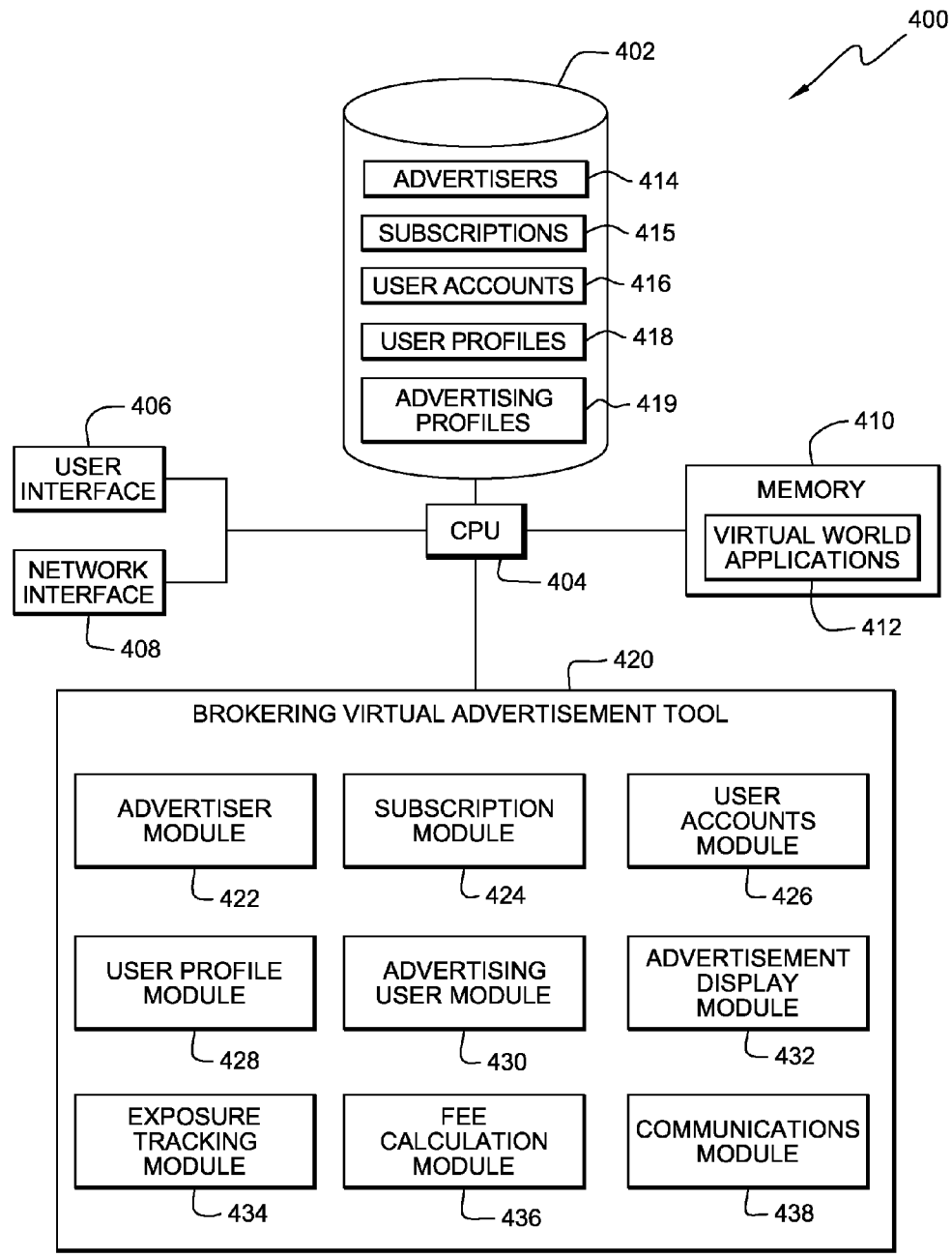
FIG. 4 is a schematic block system diagram illustrating an embodiment of a virtual world server having deployed thereon a virtual world application and a brokering virtual advertisement tool or code for brokering advertising of one or more advertisements of an advertiser on a persona associated with a virtual space belonging to an advertising user in a virtual world, in accordance with an embodiment of the present invention.

Reference is now made to FIG. 4, reference numeral 400, which depicts a schematic block system diagram illustrating one embodiment of a computer system 400, such as, a standalone or personal computer or a server that has deployed thereon or is coupled to a system that has deployed thereon a brokering virtual advertisement tool 420 that is configured to broker advertisements in a virtual world, as described herein above. As shown in FIG. 4, the server or system 400 comprises a central processing unit (CPU) 404, a local storage device 402, a user interface 406, a network interface 408 and a memory 410. The CPU 404 is configured generally to execute operations within the system/server 400, such as, the virtual world application 412 and the brokering virtual advertisement tool or code 420. The network interface 406 is configured, in one embodiment, to facilitate network communications of the system 400 over a communications channel of a network. In one embodiment, as shown in FIG. 4, the brokering virtual advertisement tool 420 comprises a logic unit that contains a plurality of modules configured to functionally execute the necessary steps of brokering advertising of products and services of advertisers on personas of users in a virtual world, such that, the one or more advertisements displayed on an online persona associated with a virtual space belonging to an advertising user dynamically changes based on a viewing user viewing the persona of the advertising user. In particular, the brokering virtual advertisement tool or code 420 comprises an advertiser module 422, a subscription module 424, a user accounts module 426, a user profile module 428, an advertising user module 430, an advertisement display module 432, an exposure tracking module 434, fee calculation module 436 and a communications module 434.

Referring to FIG. 4, the advertiser module 422 of the brokering virtual advertisement tool 420 maintains or stores data in a storage system, for instance, storage or database 402 within system 400, the data pertaining to one or more advertisers 414 advertising in a virtual world. The subscription module 424 maintains in a storage system, for instance, storage or database 402 within system 400, subscriptions 415 for the one or more advertisers willing to pay a virtual world provider for brokering advertising of products and services on an online persona associated with a virtual space belonging to a user in the virtual world. The user accounts module 426 maintains user account information 416 for the one or more users in the virtual world. The user profile module 428 maintains one or more user profiles 418 for users that are based on likes and dislikes specified by a respective user. Further, the advertising user module 430 maintains one or more advertising profiles 419 for an advertising user willing to allow an advertiser to display advertisements in a virtual space belonging to the user, the one or more advertisements being selected by the advertising user for display on an online persona of the advertising user in the virtual world. The advertisement display module 432 displays one or more advertisements on an online persona associated with an advertising user in a virtual world based on an advertising profile created for the advertising user and based on the likes and/or dislikes profile created for a viewing user. The exposure tracking module 428 tracks exposure of an advertisement on an online persona of an advertising user in the virtual world. In an embodiment, the exposure tracking module 428 tracks exposure based on one or more of the following measurements: time per viewing user that an advertisement is displayed on a respective persona of a respective advertising user in the virtual world, the number of video output frames for which an advertisement is displayed on a respective persona of a respective advertising user in the virtual world, mileage of a respective persona of a respective advertising user in the virtual world or square area covered by a respective persona of a respective advertising user in the virtual world. Further the fee calculation module 436 calculates a fee to charge to an advertiser advertising on an online persona of an advertising user in the virtual world. Further, the fee calculation module 436 calculates an amount owed to an advertising user based on advertising displayed on an online persona of an advertising user in the virtual world. The communications module 438 permits communication between the various modules of the brokering virtual advertisement tool or code 420 and other systems, such as, the storage 402.

Figure 5:
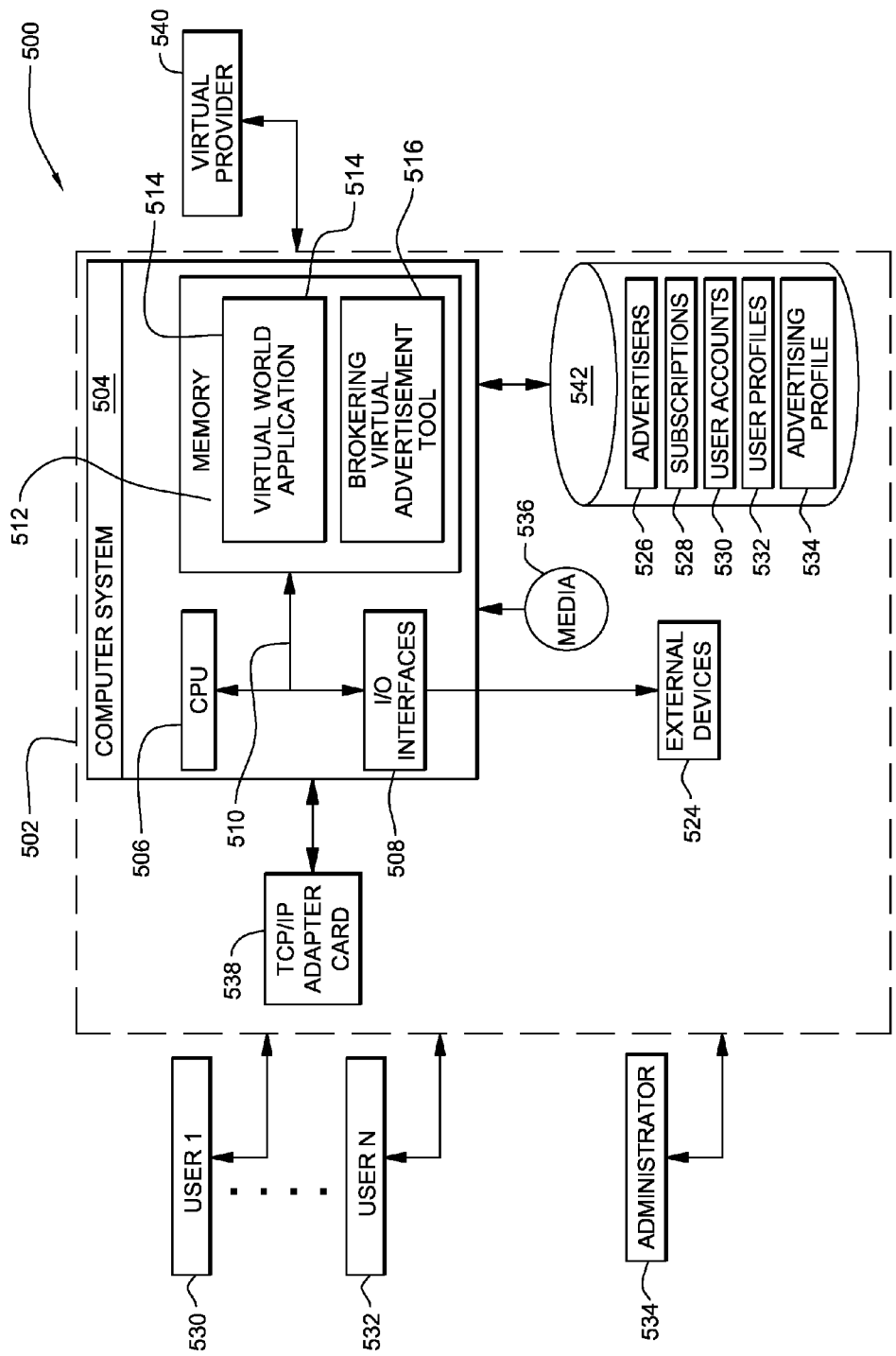
FIG. 5 is a schematic block system diagram of a virtual advertisement brokering infrastructure for brokering advertising of one or more advertisements of an advertiser on a persona associated with a virtual space belonging to an advertising user in a virtual world, in accordance with an embodiment of the present invention.

Referring now to FIG. 5, there is illustrated a computer system 500 that includes a computer infrastructure 502 having a computer program product configured to broker advertising of products and services of advertisers on personas of users in a virtual world, in accordance with an embodiment of the present invention. The computer program product comprises a computer readable or computer-usable medium, which provides program code, such as, the virtual world application 514 and the brokering virtual advertisement tool brokering virtual advertisement tool 514, for use by or in connection with a computer or any instruction execution system. The brokering virtual advertisement tool or program 514 can be loaded into computer system 504 from a computer readable media 536, such as, a magnetic tape or disk, optical media, DVD, memory stick, semiconductor memory, etc. or downloaded from the Internet via a TCP/IP adapter card 538. As depicted in FIG. 5, system 500 includes a computer infrastructure 502, which is intended to represent any type of computer architecture that is maintained in a secure environment (i.e., for which access control is enforced). As shown, infrastructure 502 includes a computer system 504 that typically represents an application server or system 504 or the like that includes a virtual world application 514 and a brokering virtual advertisement tool 516 configured to broker advertising of products and services of advertisers on personas of users in a virtual world. It should be understood, however, that although not shown, other hardware and software components (e.g., additional computer systems, routers, firewalls, etc.) could be included in infrastructure 502.

In general, user 1 (reference numeral 530) through user N (reference numeral 532) may access the virtual world application server or system 504, which has deployed thereon the virtual world application 514 and the brokering virtual advertisement tool 516, which implements the invention. The brokering virtual advertisement tool or program 516 is run on the server 504 to broker advertising of products and services of advertisers on personas of users in a virtual world. In an embodiment, the virtual world application 514 deployed on server or system 504 is configured to invoke the brokering virtual advertisement tool 516 for brokering advertising of products and services of advertisers on personas of users in a virtual world. It is understood that although the brokering virtual advertisement tool 516 is shown as being deployed on the same server as the virtual world application 514, the brokering virtual advertisement tool 516 may be deployed on another server within infrastructure 502.

As shown in FIG. 5, the virtual world application server or system 504 (which has implemented thereon the brokering virtual advertisement tool 516) is shown in communication with a general storage or file system 542, which stores a list of advertisers 526 in said virtual world as well as data pertaining to the advertisers 526, subscriptions 528 that includes data pertaining to advertisers willing to advertise on personas of users, user accounts 530 that includes data pertaining to user accounts, user profiles 532 that includes data pertaining to likes and dislikes of users in the virtual world, and advertising profiles 534 that includes data pertaining to advertisements to be displayed on one or more users based on the profiles stored in system 542 and based on advertisements selected by an advertising user to display on their online personas. In particular, a user (user 1, reference numeral 530 through user N, reference numeral 532) accesses the virtual world application server or system 504 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 502 could occur via a direct hardwired connection (e.g., serial port), or via an addressable connection that may utilize any combination of wired line and/or wireless transmission methods. Moreover, conventional network connectivity, such as Token Ring, Ethernet, Wi-Fi or other conventional communications standards could be used. Still yet, connectivity could be provided by conventional TCP/IP sockets-based protocol. In this instance, the parties could utilize an Internet service provider to establish connectivity to infrastructure 502. It should be understood that under the present invention, infrastructure 502 could be owned and/or operated by a party such as a virtual provider 540, or by an independent entity. Regardless, use of infrastructure 502 and the teachings described herein could be offered to the parties on a subscription or fee-basis. In either scenario, an administrator 534 could support and configure infrastructure 502, for instance, upgrading the brokering virtual advertisement tool 516 deployed on the virtual world application server or system 504.

The virtual world application system or server 504 is shown to include a CPU (hereinafter "processing unit 506"), a memory 512, a bus 510, and input/output (I/O) interfaces 508. Further, the server 504 is shown in communication with external I/O devices/resources 524 and storage system 542. In general, processing unit 506 executes computer program code, such as the virtual world application 514 and the brokering virtual advertisement tool 516. While executing computer program code, the processing unit 506 can read and/or write data to/from memory 512, storage system 542, and/or I/O interfaces 508. For instance, in one embodiment, the brokering virtual advertisement tool 516 stores subscriptions 528 and user profiles 532 in a working directory in storage 542. Similarly, the brokering virtual advertisement tool 516 stores other data, such as, advertisers 526 in storage 542. Alternatively, the data stored in storage 542 may be stored in a separate storage within the system 504. Bus 510 provides a communication link between each of the components in computer system 500, such that information can be communicated within the infrastructure 502. External devices 524 can comprise any devices (e.g., keyboard, pointing device, display, etc.) that enable a user to interact with computer system 500 and/or any devices (e.g., network card, modem, etc.) that enable server 504 to communicate with one or more other computing devices.

Computer infrastructure 502 is only illustrative of various types of computer infrastructures for implementing the invention. For example, in an embodiment shown, computer infrastructure 502 comprises two or more computing devices (e.g., a server cluster) that communicate over a network to perform the various process steps of the invention. Moreover, computer system 500 is only representative of various possible computer systems that can include numerous combinations of hardware. To this extent, in other embodiments, computer system 500 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 506 may comprise a single processing unit, or be distributed across one or more processing units in one or more locations, e.g., on a client and server. Similarly, memory 512 and/or storage system 542 can comprise any combination of various types of data storage and/or transmission media that reside at one or more physical locations. Further, I/O interfaces 508 can comprise any system for exchanging information with one or more external devices 524. Still further, it is understood that one or more additional components (e.g., system software, math co-processing unit, etc.) not shown in FIG. 5 can be included in computer system 500. However, if computer system 500 comprises a handheld device or the like, it is understood that one or more external devices 524 (e.g., a display) and/or storage system(s) 542 could be contained within computer system 504, and not externally as shown. Storage system 542 can be any type of system (e.g., a database) capable of providing storage for information under the present invention, such as the files to be preprocessed by the brokering virtual advertisement tool 516. To this extent, storage system 542 could include one or more storage devices, such as a magnetic disk drive or an optical disk drive. In another embodiment, storage system 542 includes data distributed across, for example, a local area network (LAN), wide area network (WAN) or a storage area network (SAN) (not shown). Although not shown, additional components, such as cache memory, communication systems, system software, etc., may be incorporated into computer system 500.

Accordingly, the invention provides the ability to have clothing or sign associated with an online persona, such as, an avatar or pet, to change in accordance with who is looking at the online persona. Not only does the virtual user receive benefit or payment for allowing use of the space for advertising or marketing of products and/or services and/or company name within the virtual world (for instance, a T-shirt with a particular logo, or advertising on a headband or other clothing or accessories worn by their online persona or their pet), but the virtual world provider also benefits as the virtual world provider is paid for acting as a broker or agent who makes the advertising deal between the user and the advertising company happen. Moreover, the advertising companies gain advertising opportunity by advertising on the online personas of virtual world users and can customize or tailor their advertising a viewing user is viewing in the virtual world space based on a viewing user's likes and/or dislikes profile.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system for managing advertisements displayed in a virtual world, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to define first, second and third avatars in a virtual world, and responsive to control inputs from first, second and third humans, to move the first, second and third avatars, respectively, in the virtual world;
program instructions to define the virtual world from a first perspective as viewed by the first avatar and a second perspective as viewed by the second avatar; and
program instructions to initiate display on a computer monitor of the first human the virtual world from the first perspective and concurrently initiate display on a computer monitor of the second human the virtual world from the second perspective, the first perspective of the virtual world including the third avatar and a first advertisement displayed on the third avatar, the second perspective of the virtual world including the third avatar and a second advertisement displayed on the third avatar, the third avatar concurrently displaying the first advertisement in the first perspective of the virtual world and the second advertisement in the second perspective of the virtual world, the first advertisement correlated to an interest of the first human as previously recorded in a profile for the first user, the second advertisement correlated to an interest of the second human as previously recorded in a profile for the second user, the third avatar in the first perspective of the virtual world not displaying the second advertisement, and the third avatar in the second perspective of the virtual world not displaying the first advertisement.

2. The computer system of claim 1 wherein the third avatar displays the first advertisement in the first instance of the virtual world in response to the first avatar viewing the third avatar, and the third avatar displays the second advertisement in the second instance of the virtual world in response to the second avatar viewing the third avatar.

3. The computer system of claim 1 wherein:
the first advertisement is also correlated to an interest of the third human as previously recorded in a profile for the third human, and
the second advertisement is also correlated to an interest of the third human as previously recorded in a profile for the third human.

4. The computer system of claim 1 wherein:
the first advertisement is also correlated to an interest of the third human as previously recorded in a profile for the third human such that the first advertisement reflects a common interest of both the first and third humans, and the second advertisement is also correlated to an interest of the third human as previously recorded in a profile for the third human such that the second advertisement reflects a common interest of both the second and third humans.

5. The computer system of claim 1 further comprising program instructions, stored on at least one of the one or more storage devices for execution by at least one of the one or more processors via at least one of the one or more memories, to determine (a) a bill for an advertiser sponsoring the first advertisement based in part on an amount of time that the third avatar displays the first advertisement in the first perspective of the virtual world, and (b) a bill for an advertiser sponsoring the second advertisement based in part on an amount of time that the third avatar displays the second advertisement in the second perspective of the virtual world.

6. A computer program product for managing advertisements displayed in a virtual world, the computer program product comprising:
one or more computer-readable tangible storage devices and program instructions stored on at least one of the one or more storage devices, the program instructions comprising:
program instructions to define first, second and third avatars in a virtual world, and responsive to control inputs from first and second humans, to move the first and second avatars, respectively, in the virtual world;
program instructions to define the virtual world from a first perspective as viewed by the first avatar and a second perspective as viewed by the second avatar; and
program instructions to initiate display on a computer monitor of the first human the virtual world from the first perspective and concurrently initiate display on a computer monitor of the second human the virtual world from the second perspective, the first perspective of the virtual world including the third avatar and a first advertisement displayed on the third avatar, the second perspective of the virtual world including the third avatar and a second advertisement displayed on the third avatar, the third avatar concurrently displaying the first advertisement in the first perspective of the virtual world and the second advertisement in the second perspective of the virtual world, the first advertisement correlated to an interest of the first human as previously recorded in a profile for the first user, the second advertisement correlated to an interest of the second human as previously recorded in a profile for the second user, the third avatar in the first perspective of the virtual world not displaying the second advertisement, and the third avatar in the second perspective of the virtual world not displaying the first advertisement.

7. The computer program product of claim 6 wherein the third avatar displays the first advertisement in the first instance of the virtual world in response to the first avatar viewing the third avatar, and the third avatar displays the second advertisement in the second instance of the virtual world in response to the second avatar viewing the third avatar.

8. The computer program product of claim 6 wherein:
the first advertisement is also correlated to an interest of a third human represented by the third avatar, as previously recorded in a profile for the third human, and
the second advertisement is also correlated to an interest of the third human as previously recorded in a profile for the third human.

9. The computer program product of claim 6 wherein:
the first advertisement is also correlated to an interest of a third human represented by the third avatar, as previously recorded in a profile for the third human such that the first advertisement reflects a common interest of both the first and third humans, and
the second advertisement is also correlated to an interest of the third human as previously recorded in a profile for the third human such that the second advertisement reflects a common interest of both the second and third humans.

10. The computer program product of claim 6 further comprising program instructions, stored on at least one of the one or more storage devices for execution by at least one of the one or more processors via at least one of the one or more memories, to determine (a) a bill for an advertiser sponsoring the first advertisement based in part on an amount of time that the third avatar displays the first advertisement in the first perspective of the virtual world, and (b) a bill for an advertiser sponsoring the second advertisement based in part on an amount of time that the third avatar displays the second advertisement in the second perspective of the virtual world.

11. The computer program product of claim 6 wherein the third avatar represents a third human, and the program instructions to move the first and second avatars, are responsive to control inputs from the third human, to move the third avatar in the virtual world.

12. A computer system for managing advertisements displayed in a virtual world, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to define first, second and third avatars in a virtual world, and responsive to control inputs from first and second humans, to move the first and second avatars, respectively, in the virtual world;
program instructions to define the virtual world from a first perspective as viewed by the first avatar and a second perspective as viewed by the second avatar; and
program instructions to initiate display on a computer monitor of the first human the virtual world from the first perspective and concurrently initiate display on a computer monitor of the second human the virtual world from the second perspective, the first perspective of the virtual world including the third avatar and a first advertisement displayed on the third avatar, the second perspective of the virtual world including the third avatar and a second advertisement displayed on the third avatar, the third avatar concurrently displaying the first advertisement in the first perspective of the virtual world and the second advertisement in the second perspective of the virtual world, the first advertisement correlated to an interest of the first human as previously recorded in a profile for the first user, the second advertisement correlated to an interest of the second human as previously recorded in a profile for the second user, the third avatar in the first perspective of the virtual world not displaying the second advertisement, and the third avatar in the second perspective of the virtual world not displaying the first advertisement.

13. The computer system of claim 12 wherein the third avatar displays the first advertisement in the first instance of the virtual world in response to the first avatar viewing the third avatar, and the third avatar displays the second advertisement in the second instance of the virtual world in response to the second avatar viewing the third avatar.

14. The computer system of claim 12 wherein:
the first advertisement is also correlated to an interest of a third human represented by the third avatar, as previously recorded in a profile for the third human, and
the second advertisement is also correlated to an interest of the third human as previously recorded in a profile for the third human.

15. The computer system of claim 12 wherein:
the first advertisement is also correlated to an interest of a third human represented by the third avatar, as previously recorded in a profile for the third human such that the first advertisement reflects a common interest of both the first and third humans, and
the second advertisement is also correlated to an interest of the third human as previously recorded in a profile for the third human such that the second advertisement reflects a common interest of both the second and third humans.

16. The computer system of claim 12 further comprising program instructions, stored on at least one of the one or more storage devices for execution by at least one of the one or more processors via at least one of the one or more memories, to determine (a) a bill for an advertiser sponsoring the first advertisement based in part on an amount of time that the third avatar displays the first advertisement in the first perspective of the virtual world, and (b) a bill for an advertiser sponsoring the second advertisement based in part on an amount of time that the third avatar displays the second advertisement in the second perspective of the virtual world.

\* \* \* \* \*